United States Patent [19]

Kim

[11] Patent Number: 5,140,476
[45] Date of Patent: Aug. 18, 1992

[54] APPARATUS AND METHOD FOR TRACING A TRACK CENTER OF A MAGNETIC DISC

[75] Inventor: Sang Young Kim, Anyang, Rep. of Korea

[73] Assignee: Goldstar Telecommunication Co., Ltd., Seoul, Rep. of Korea

[21] Appl. No.: 440,260

[22] Filed: Nov. 22, 1989

[30] Foreign Application Priority Data

Nov. 30, 1988 [KR] Rep. of Korea ............... 88-15922

[51] Int. Cl.$^5$ .............................................. G11B 5/596
[52] U.S. Cl. .............................. 360/77.06; 360/77.02
[58] Field of Search ............. 360/77.01, 77.02, 77.06, 360/77.07, 77.08, 77.05

[56] References Cited

U.S. PATENT DOCUMENTS

| 4,454,549 | 6/1984 | Pennington | 360/77.08 |
| 4,511,938 | 4/1985 | Betts | 360/77.08 |
| 4,549,232 | 10/1985 | Axmear et al. | 360/77.07 |
| 4,656,538 | 4/1987 | Mattson | 360/77.08 |
| 4,843,496 | 6/1989 | Marchetti | 360/77.06 |
| 4,910,616 | 3/1990 | Sirai et al. | 360/77.02 |

Primary Examiner—John H. Wolff

[57] ABSTRACT

The deviation of head and track at a most outside position conference track (PtO) and at a most inside position conference tract (Pti), the deviation value is processed in accordance with the linear interpolation, and the deviation of the head from a certain data track can be forecasted. If these position reference tracks (Pt) are used and the deviation of head from the certain track is processed according to the interpolation of curve of second order, the deviation of the head from the track is forecasted more precisely, and the deviation can be compensated for to trace the track center correctly.

3 Claims, 6 Drawing Sheets

Fig.1 PRIOR ART
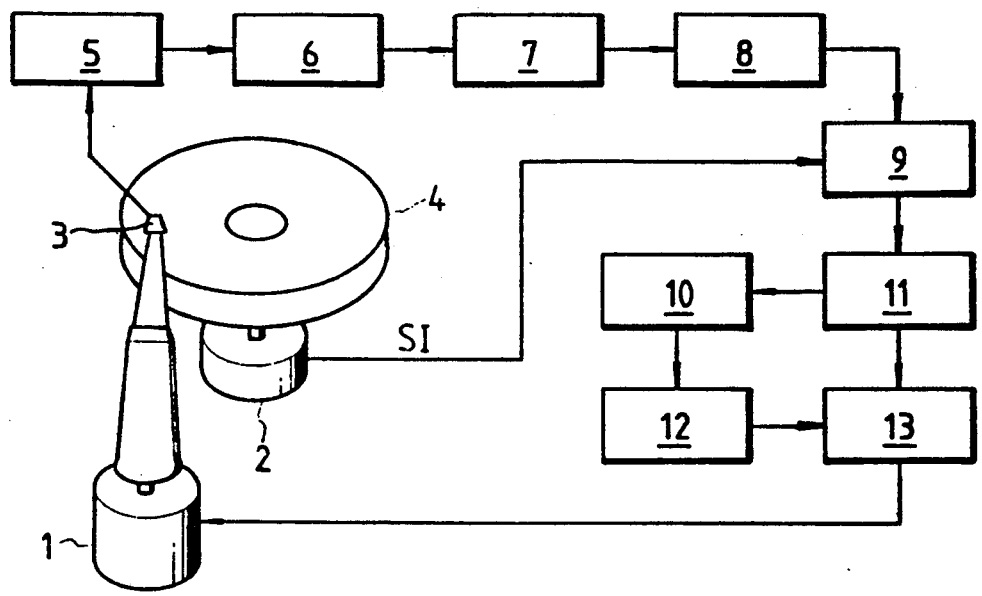
Fig.2 PRIOR ART
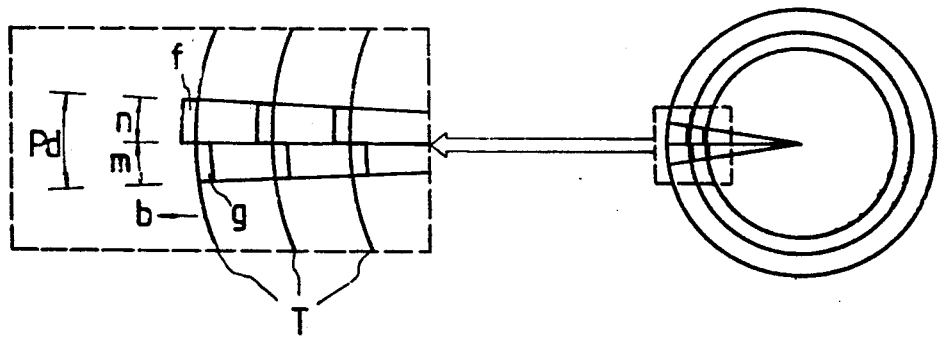
Fig.3 (A) PRIOR ART
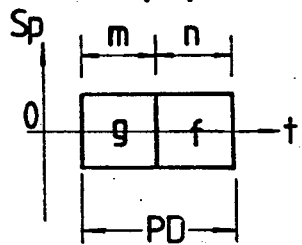
Fig.3 (B) PRIOR ART
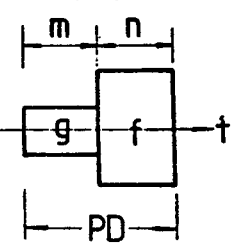
Fig.3 (C) PRIOR ART
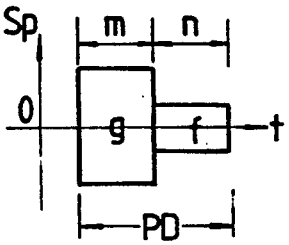

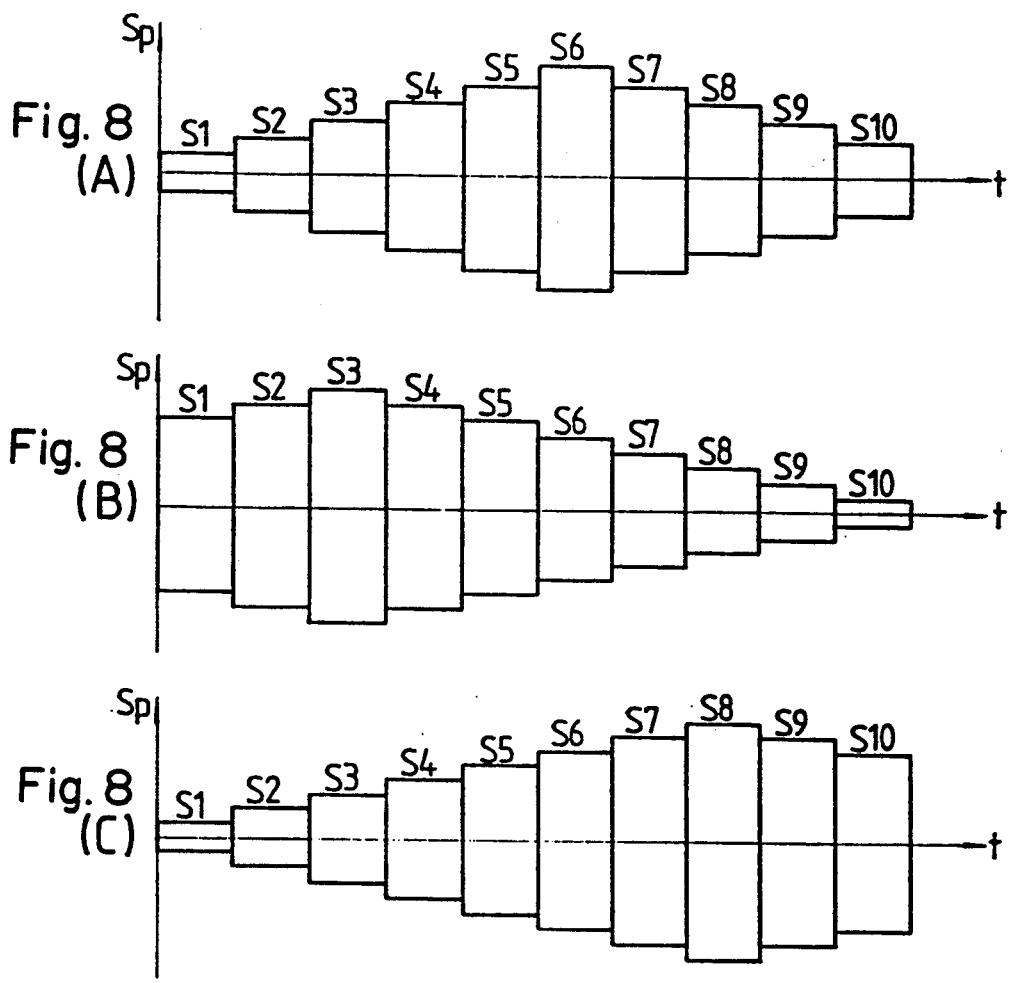
Fig. 8 (A)
Fig. 8 (B)
Fig. 8 (C)
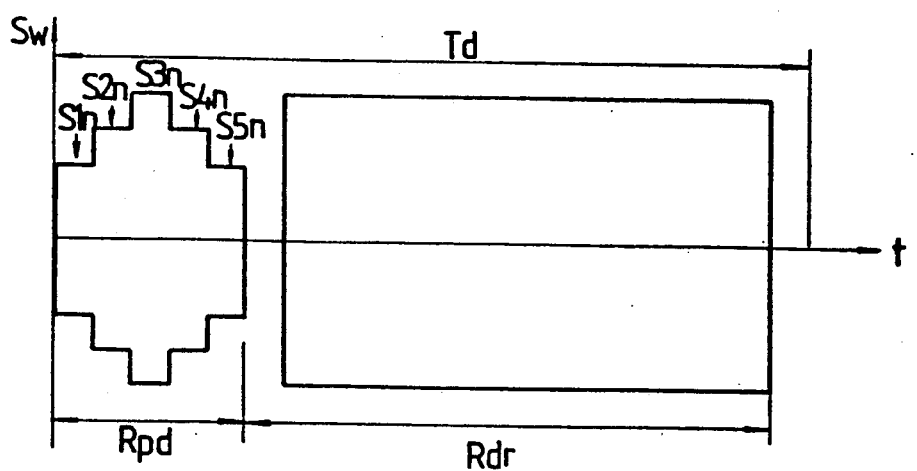
Fig. 9

APPARATUS AND METHOD FOR TRACING A TRACK CENTER OF A MAGNETIC DISC

BACKGROUND OF THE PRESENT INVENTION

The present invention is related to an apparatus and method for tracing the track center of a magnetic disc with high reliability and low cost.

In the prior art, as shown in FIG. 1, the apparatus comprises a head (3) drived by a position control motor (1) which reads out inside/outside position information recorded in a position information region (Pd) of a disc (4) driven by spindle motor (2). The head 3 is connected to a preamplifier (5). The preamplifier (5) is connected to an A/D (analog to digital) converter through a peak detector (6) and sample and hold circuit (7). The A/D converter (8) is connected to a microprocessor (9). The microprocessor (9) receives index signal (SI) from the spindle motor (2) and is connected to a data latch circuit (11). The data latch circuit (11) is connected to a D/A (digital to analog) converter (10) and a position drive circuit (13). The D/A converter (10) is connected to the position drive circuit (13) through an adder (12). The position drive circuit (13) is connected to the position control motor (1).

BRIEF DESCRIPTION OF THE DRAWINGS

The present invention will become clear from the following description with reference to the accompanying drawings wherein;

FIG. 1 is a block diagram of an apparatus for tracing a track center of a magnetic disc in the prior art;

FIG. 2 is an illustration of recording position information on magnetic disc in the prior art;

FIG. 3 is an illustration of position information signals readed from the magnetic disc in the prior art where, (A) is a case without deviation of head-track,
(B) is a case which the head deviates from the regular track position to the position of the n-signal, and
(C) is a case which the head deviates from the regular track position to the position of the m-signal;

FIG. 8 is an illustration of position reference signals readed from the position reference track of magnetic disc according to the present invention where (A) is a case without deviation of head-track,
(B) is a case which the head deviates to the position of first sector from the regular track position, and
(C) is a case which the head deviates to the position of last sector from the regular track position;

FIG. 9 is an illustration of position information signals readed where the position information at the data track of the magnetic disc according to the present invention is composed of 5 sectors;

DETAILED DESCRIPTION OF THE PRESENT INVENTION

Figure 4:
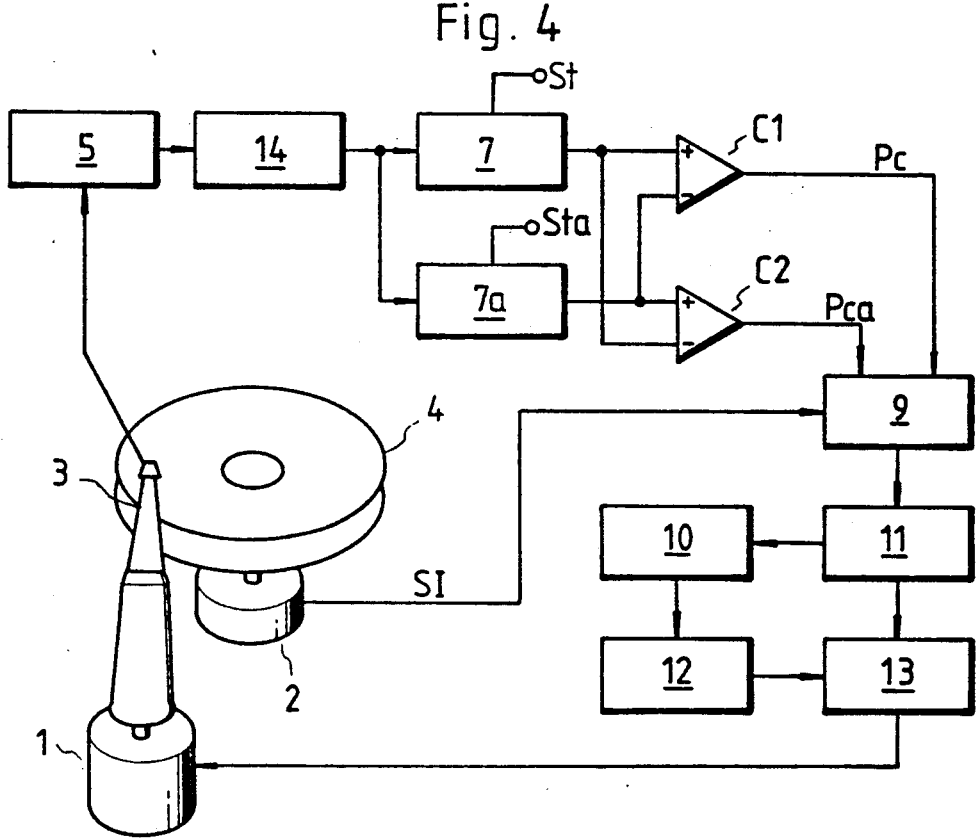
FIG. 4 is a block diagram of an apparatus for tracing a track center of a magnetic disc according to the present invention.

The construction of the apparatus for tracing a track center of a magnetic disc in the prior art is described in detail above. The explanation for the operation and effectiveness of the apparatus in the prior art may be helpful for good understanding of the present invention.

As shown in FIG. 1, the information is recorded on the disc (4) to form magnetic information tracks. With the lapse of the time after recording the information, the external environment like temperature, humidity etc. changes, and the status of the components in the magnetic disc recorder also change, so the position of head (3) deviates from the magnetic information track on the disc, thereby not reading the recorded information correctly.

To compensate for this problem (deviation of the head in magnetic disc recorder), at the optional data track position of the magnetic disc recorder, the deviation of the head (3) from the track of disc (4) is measured, and the head (3) is made to coincide with the track by compensating the deviation in order to read the reproduced information correctly. Therefore with the use of an encoder for detecting position or step motor etc., the head (3) is moved to the each track position (T) and then position information (f) (g) is recorded in the position information region (Pd) on the disc (4) to define each track position.

The recording method of position information (f) (g) is to record the inside position information (g) signal at a constant frequency in the inside position information interval (m) by shifting the head (3) one third of the distance from the track (T) towards a adjacent track, and to record the outside position information (f) in the outside position information interval (n) by shifting the head (3) the same distance from the track (T) towards a adjacent track in an opposite direction (b direction).

The position information (g) (f) recorded by this method is used to make the head (3) coincide to the track required.

While the head (3) reads the position information (g) (f) on the disc (4), if the track (T) and head (3) correspond, the signal of the inside position information interval (m) and the signal of the outside position information interval (n) are same as shown in FIG. 3 (A). If the head (3) is outside of the track (T), signal (f) of outside position information interval (n) is greater than signal (g) of inside position information interval (m) as shown in FIG. 3 (B). If the head (3) is inside of the track (T), signal (g) of inside position information interval (m) is greater than the signal (f) of outside position information interval (n).

The larger the deviation of the head (3) from track is, the larger the difference between inside position information (g) and outside position information (f).

The head (3) reads such position information and sends it to the preamplifier (5).

The position information signal is amplified in preamplifier (5) and applied to the A/D converter (8) through peak detector (6) and sample and hold circuit (7). The signal applied to the A/D converter (8) is changed into a digital signal. When the position information (g) (f) of inside position information interval (m) and outside position information (n) are inputted into the microprocessor (9), the microprocessor (9) processes the position information to detect the deviation of the head (3) from track (T) on the disc (4) and to drive the position control motor (1) of the head (3) to compensate for the deviation, thereby causing the head (3) to coincide with the track (T).

In the prior art as described in the above, for two A/D converters (8) the production cost is increased, and when the head (3) deviates from the track (T) so that no position information (f) (g) is read, the track (T) can not be traced.

The present invention provides a method and apparatus to improve the problems described in the above in accordance with the drawings.

The detailed description of the present invention will be followed with the drawings according to the present invention. The apparatus for tracing a track center of a magnetic disc according to the present invention is shown in FIG. 4. The apparatus comprises a head driven by the position control motor (1) which reads position information from the disc (4) driven by spindle motor (2) and sends the information to preamplifier (5). The preamplifier (5) receives the position information, which is connected to a sample and hold circuit (7, 7a) and operated by trigger signals (St,St2) through envelope detector (14). The sample and hold circuit (7) operated by the trigger signal (St) is connected to the (+) terminal of comparator (C1) and (−) terminal of comparator (C2), and the sample and hold circuit (7a) operated by the trigger signal (Sta) is connected to the (−) terminal of comparator (C1) and (+) terminal of the comparator (C2). A microprocessor (9) receives index signal (SI) from the spindle motor (2) which is inputted with the output signal (Pc), (Pca) of comparator (C1,C2). The microprocessor is connected to data latch circuit (11). The data latch circuit (11) is connected to the D/A converter (10) and position drive circuit (13) respectively. An adder (12) is connected to the position drive circuit (13), and is connected to D/A converter (10). The position drive circuit (13) is connected to the position control motor (1) to drive the position control motor (1).

The operation and the effectiveness of the apparatus according to the present invention will be described with the drawings below.

Figure 5:
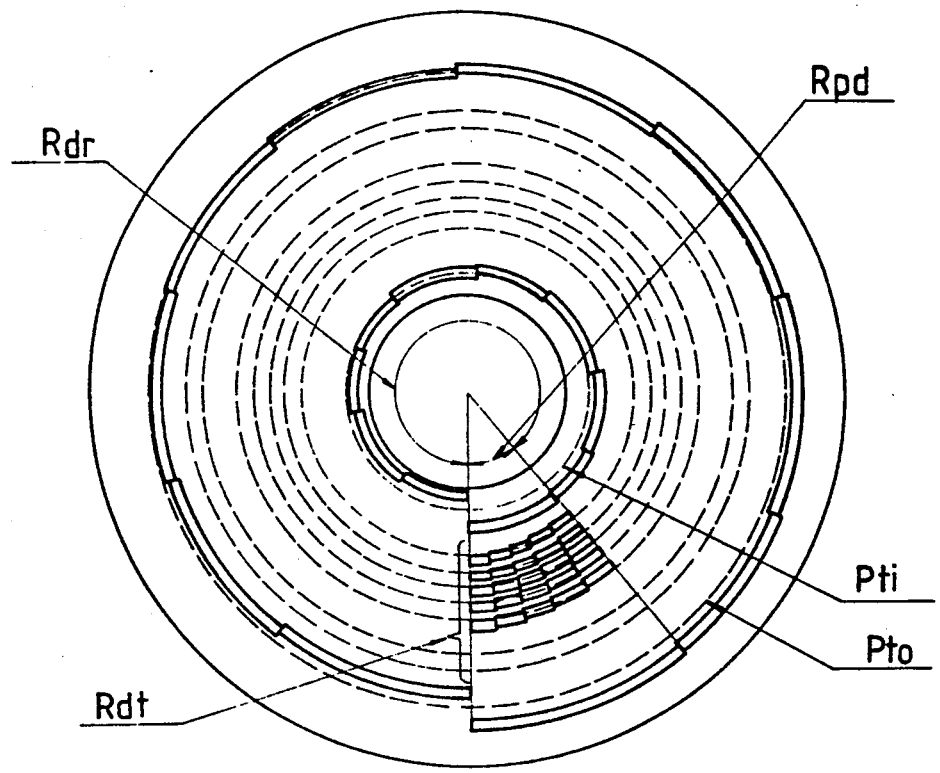
FIG. 5 is an illustration of position information of the magnetic disc according to the present invention.

In the disc (4) in the FIG. 4, the position information, as shown in FIG. 5, is recorded in the position reference tracks (Pt0, Pt1) of the most outside track and the most inside track. The other position reference track is available in the data track region (Rdt) to take the more precise position reference.

Figure 6:
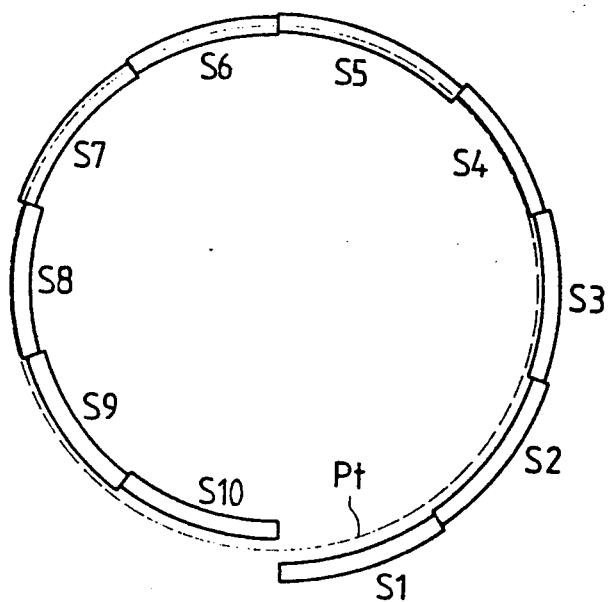
FIG. 6 is an illustration of position information recorded with dividing a status reference track between the most inside sector and the most outside sector of magnetic disc into 10 sectors according to the present invention.

FIG. 6 is an illustration plan of position information is the most inside/outside position reference tracks (Pt0,Pti).

On the disc, the position information can be recorded for one rotation. The position information signals on the position reference track (Pt0, Pti) are composed of the several equivalent interval sectors (S1–S10), and when the track is divided into ten sectors having position information, the position information is recorded at a constate frequency with 10 successive interval deviation towards the adjacent track the middle sector between the first sector and the last sector is adjusted to the center of position reference track (Pt).

For example, when the track is divided into ten, as shown in FIG. 6, the center of 5th or 6th sector is adjusted to the center of position reference track (Pt), in the case of FIG. 6 the center of position reference track (Pt) is set to the center of the 6th sector.

Figure 7:
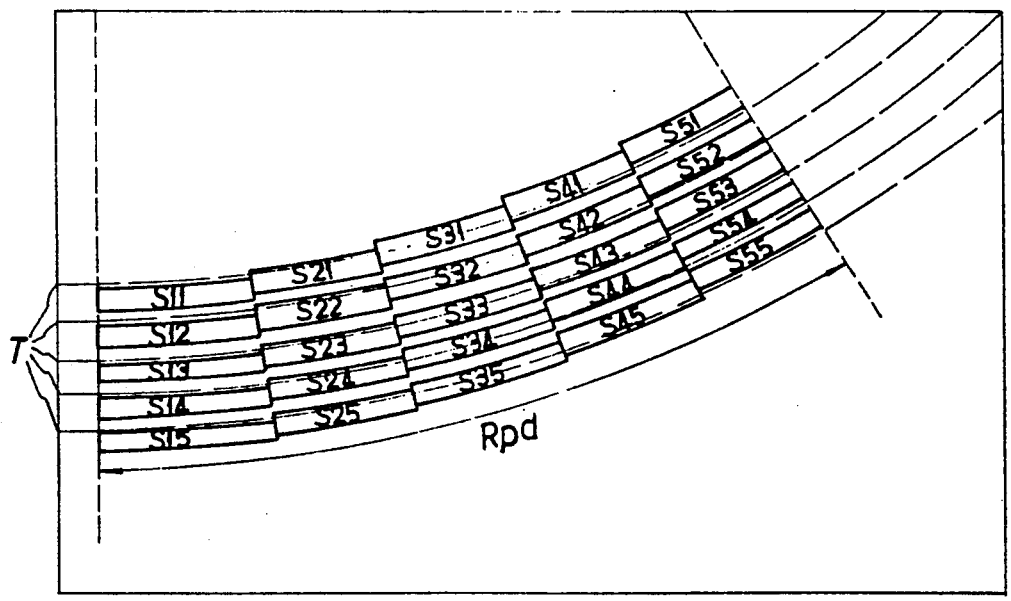
FIG. 7 is an illustration of position information recorded by dividing a data track into 5 sectors according to the present invention.

FIG. 7 illustrates the recording regions (Rpd) of position information in the data track region (Rdt). The position information recorded on each data track (T) is recorded in the same shape of those in position reference tracks (Pt0, Pti), however the limited space of each track (T), i.e., only the position information recording regions (Rpd) are recorded with position information and the rest of the tracks are recorded with data as the data recording region (Rdr).

The position information on the position reference tracks (Pt0, Pti) is recorded in such a way that a wide detection can be utilized. This wide detection allows more precise position information to be obtained at each data track region (Rdt).

If there is no deviation between the position reference track (Pt) and the head as shown in FIG. 6, the position information in the middle sector (S6 of FIG. 6) is read out. If the position of head is inclined to the direction of sector (S1) (outward), the first sector (S1) is read out, and the third sector (S3) is read out the most so that the head coincides with the sector (S3) as shown in FIG. 8(B).

If the position of head is inclined inwardly towards the direction of sector (S10), the eighth sector (S3) is read out the most so that the head coincides with the sector (S8) of FIG. 6 as shown in FIG. 8 (c). FIG. 9 illustrates the size of position reference signal in the data track region (Rdt) of FIG. 5, i.e., the size of signal when rotating once around the track (T) with position information divided into 5 sectors as shown in FIG. 7.

Figure 10:
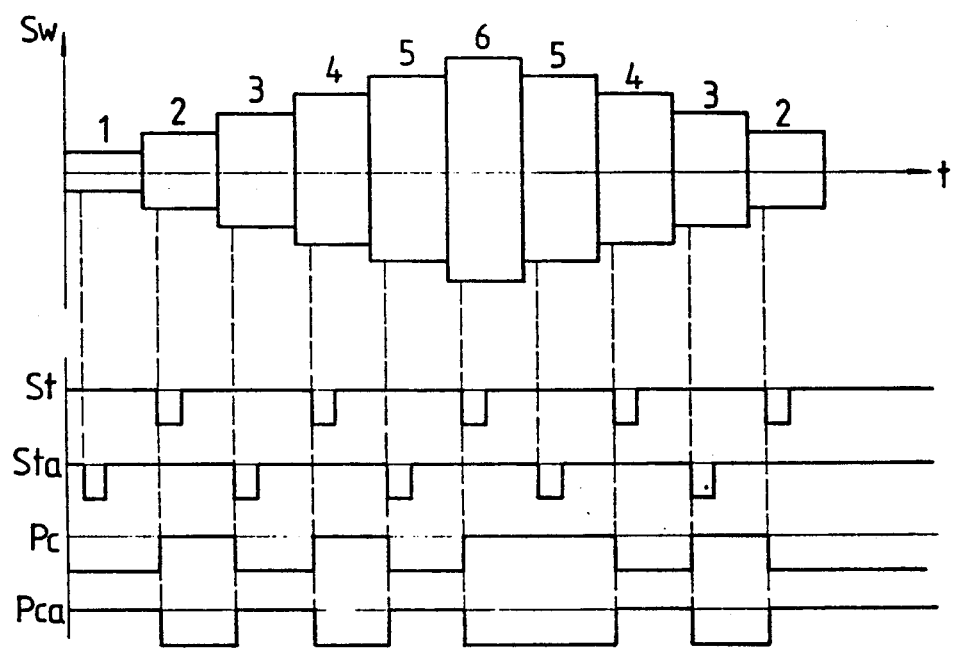
FIG. 10 is a waveform of signals corresponding to the each part of the apparatus for tracing the track center of the magnetic disc according to the present invention.
Figure 11:
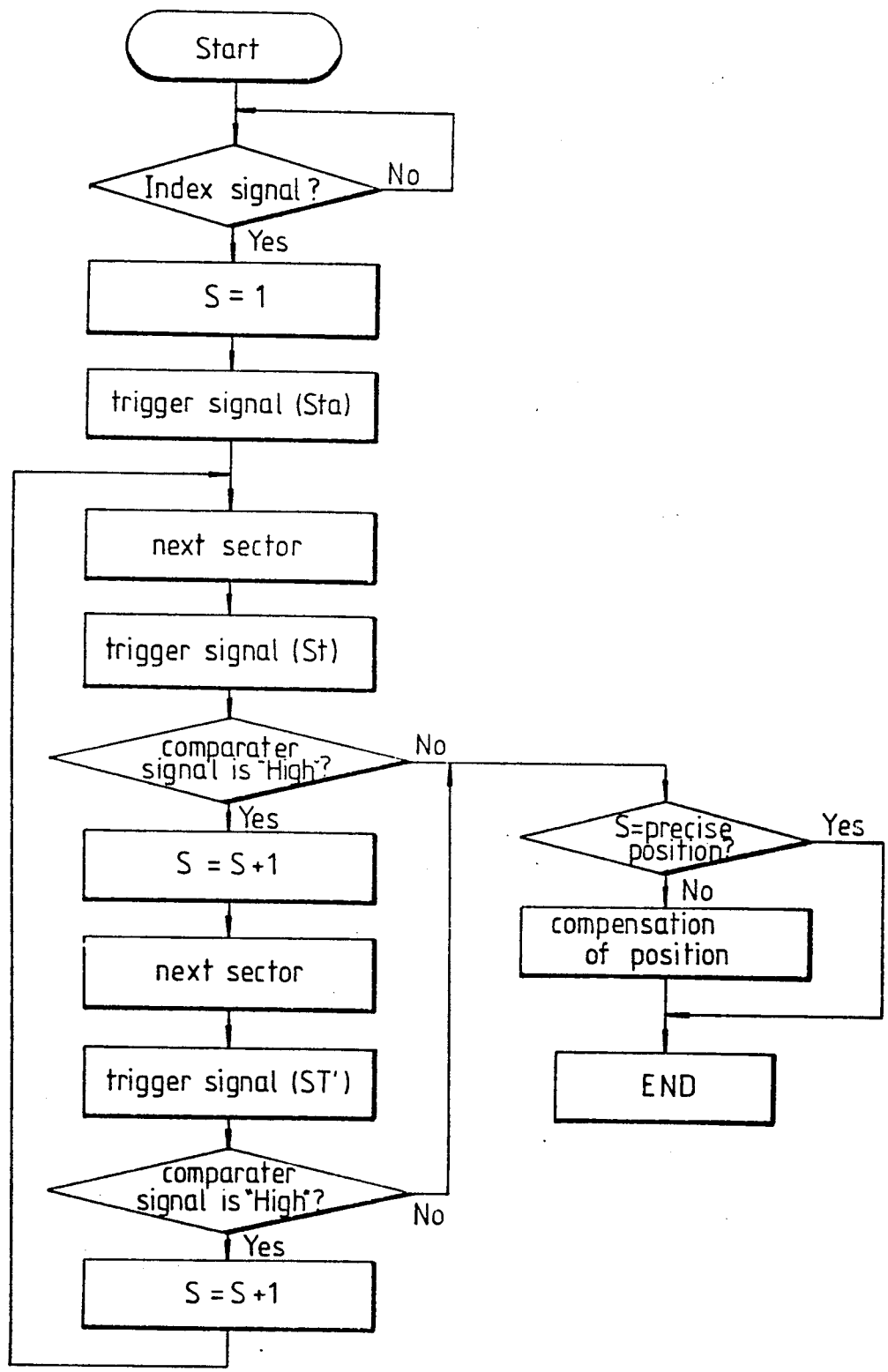
FIG. 11 is the flowchart for correcting a position of head according to the present invention.

FIG. 11 is a flowchart to describe the procedure to trace the track center on the disc (4) of FIG. 4. With a standard index signal (SI) from a spindle motor (2) driving disc (4) of FIG. 4, the head (3) reads the position information recorded in the first sector after waiting a certain time and sends the output to an envelope detector (14) through preamplifier (5). The signals from envelope detector (14) are applied to the sample and hold circuits (7, 7a). If the trigger signal (Sta) of sample and hold circuit (7a) is applied like FIG. 10, the output of the sample and hold circuit (7a) stores the size of position information read out from the first sector.

When the position information of second sector is read out, the trigger signal like in FIG. 10 is applied to the sample and hold circuit (7), and the size of position information of second sector is held at the output terminal of sample and hold circuit (7). The sizes of the two signals are compared and applied to the microprocessor (9).

At that time if the compared signal (Pc) is "High", it means that the size of position information in second sector is larger than the size of position information in first sector as a normal situation.

After waiting until the head reads the position information in next sector, the trigger signal (Sta) is applied and the compared signal (Pca) is confirmed. If the compared signal is "High", it means that this signal of the present sector is larger than that of the former sector. If the compared signal is "Low", it means that the signal of the present sector becomes smaller.

By repeating such operations, the number of sector in which the size of signal is started becomes smaller and can be detected. The size and direction of deviation of the head (3) from track (T) for the present status of the head (3) can be detected.

By knowing the deviation of head from track at the most outside position conference track (Pt0) and the most inside position conference track (Pti), the deviation value is processed in accordance with the linear interpolation and the deviation of head track in a certain data track can be forecasted.

If these position reference tracks (Pt) are used, the deviation of head from a certain data track is processed according to the interpolation of curve of second order, the deviation of head-track is forecasted more precisely and compensated to trace track center correctly.

The deviation of head-track in the data track region (Rdt) is detected in the same way of detecting the deviation of head-track at position reference track (Pt). In the apparatus and method for tracing the track center in the magnetic disc according to the present invention, the production cost of the apparatus according to the present invention is inexpensive, the size and direction of deviation of head-track are displayed with the lapse of the time in order to trace the track center easily, and the precise size and direction of head-track deviation in wide range can be detected easily by the method of recording double position information like the position information of position reference track (Pt) and data track region (Rdt).

While there has been described what is at present considered to be preferred embodiment of the invention, it will be understood that various modifications may be made therein, and it is intended to cover in the appended claims all such modifications as fall within the true spirit and scope of the invention.

What is claimed is:

1. An apparatus for tracking a track center of a magnetic disk comprising:
   a head for reading position information recorded on the magnetic disk;
   a preamplifier connected to said head;
   envelope means for determining amplitudes of signals representing the position information;
   sample and hold means for storing said amplitudes;
   comparing means for comparing the stored amplitudes; and
   a microprocessor for determining a track center of a magnetic disk from a result of the comparison of said stored amplitudes.

2. A method of tracking a track center of a magnetic disk recorder comprising the steps of:
   (a) reading position information from a magnetic disk;
   (b) detecting amplitudes of signals representing the recorded position information;
   (c) storing the detected amplitudes;
   (d) comparing the stored amplitudes; and
   (e) determining the track center from the comparison executed in step (d).

3. The method as claimed in claim 2, wherein position information is recorded on the magnetic disk in dividing sectors, the amplitude of the signal representing the position information read from the sectors is changed in accordance with a deviation of a head from a track in order to display size and direction of the deviation, thereby measuring the deviation precisely.

* * * * *